(12) United States Patent
Chang et al.

(10) Patent No.: US 7,745,040 B2
(45) Date of Patent: *Jun. 29, 2010

(54) SAFETY DEVICE FOR PREVENTING OVERCHARGE OF SECONDARY BATTERIES AND SECONDARY BATTERIES THEREWITH

(75) Inventors: Sung Kyun Chang, Daejeon (KR); Jae Hyun Lee, Daejeon (KR); Joon Hwan Lee, Daejeon (KR); Soo Hyun Ha, Busan (KR); Jeong Ju Cho, Daejeon (KR)

(73) Assignee: LG Chem, Ltd. (KR)

( * ) Notice: Subject to any disclaimer, the term of this patent is extended or adjusted under 35 U.S.C. 154(b) by 605 days.

This patent is subject to a terminal disclaimer.

(21) Appl. No.: 11/209,462

(22) Filed: Aug. 23, 2005

(65) Prior Publication Data

US 2006/0043935 A1 Mar. 2, 2006

(30) Foreign Application Priority Data

Aug. 24, 2004 (KR) ............... 10-2004-0066778

(51) Int. Cl.
*H01M 2/10* (2006.01)
(52) U.S. Cl. .................................... 429/96; 320/134
(58) Field of Classification Search .................. 429/96; 320/134
See application file for complete search history.

(56) References Cited

U.S. PATENT DOCUMENTS

| 5,766,793 | A |   | 6/1998 | Kameishi et al. |
|---|---|---|---|---|
| 6,037,071 | A | * | 3/2000 | Poirier et al. ............... 429/7 |
| 6,150,051 | A | * | 11/2000 | Du Pasquier et al. ......... 429/62 |
| 6,391,491 | B1 |   | 5/2002 | Kim |
| 2003/0027036 | A1 | * | 2/2003 | Emori et al. ................ 429/61 |

FOREIGN PATENT DOCUMENTS

CH 651963 A * 10/1985

(Continued)

OTHER PUBLICATIONS

International Search Report; International Application No. PCT/KR2005/002356/ International Filing Date Jul. 21, 2005; Applicant's File Reference FPC05012-PCT; Date of Mailing Sep. 28, 2005; 3 pages.

(Continued)

*Primary Examiner*—Jane Rhee
(74) *Attorney, Agent, or Firm*—Cantor Colburn LLP

(57) ABSTRACT

An object of the present invention is to provide the device for protecting a secondary battery safely from overvoltage and overheating caused by the overcharge by using simple safety device, which provides a contacted safety device which connects between a constant voltage element showing a discharge characteristic in the state of overvoltage and a MIT (metal insulator transition) element showing a discharge characteristic in the state of overheating. Each of the constant voltage element and the MIT element are connected in parallel between a cathode lead and an anode lead of the secondary battery. The contacted safety device has a characteristic combining a discharge/heat dissipation characteristic of the constant voltage element and a discharge characteristic of the MIT element which immediately responds to the heat dissipation of the constant voltage element, resulting in effect of preventing overcharge advantageously since the contacted safety device makes discharge in terms of 2 factors of voltage and temperature in case of overcharge.

11 Claims, 7 Drawing Sheets

FOREIGN PATENT DOCUMENTS

| | | |
|---|---|---|
| CH | 651963 A5 | 10/1985 |
| DE | 2933546 | 7/1980 |
| JP | 09134714 | 5/1997 |
| JP | 3053993 A | 9/1998 |
| JP | 11273651 | 10/1999 |
| JP | 2002043104 | 2/2002 |
| JP | 2002141208 | 5/2002 |
| JP | 2002-330540 | 11/2002 |
| JP | 2003-288946 | 10/2003 |
| SU | 616688 A1 | 7/1978 |
| SU | 748589 A1 | 7/1980 |
| WO | 97/38455 | 10/1997 |
| WO | 2007/011175 A1 | 1/2007 |

OTHER PUBLICATIONS

European Supplementary Search Report for Application No. 05780781.0-2119; Dated: Jun. 6, 2008.

* cited by examiner

[Figure 1A]
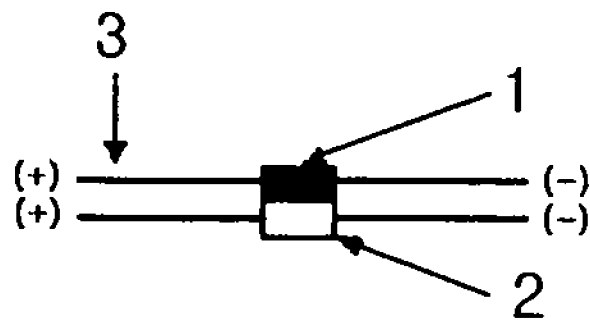
[Figure 1B]
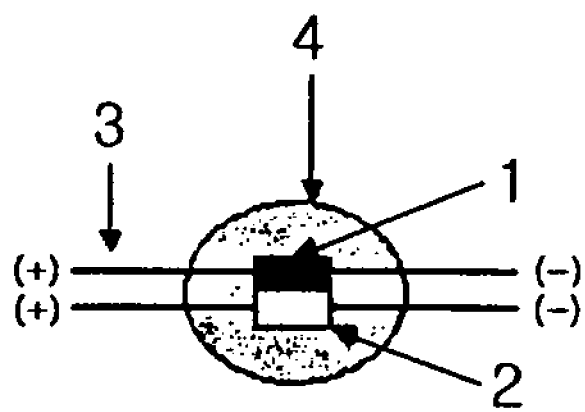
[Figure 1C]
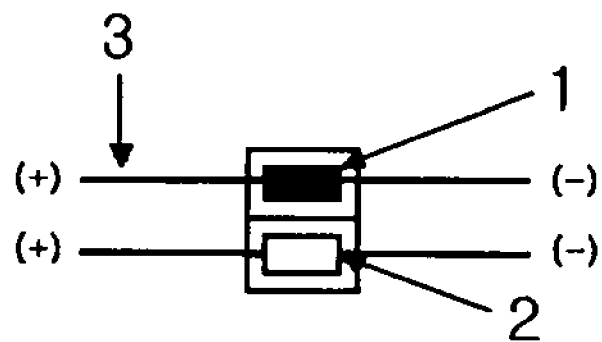

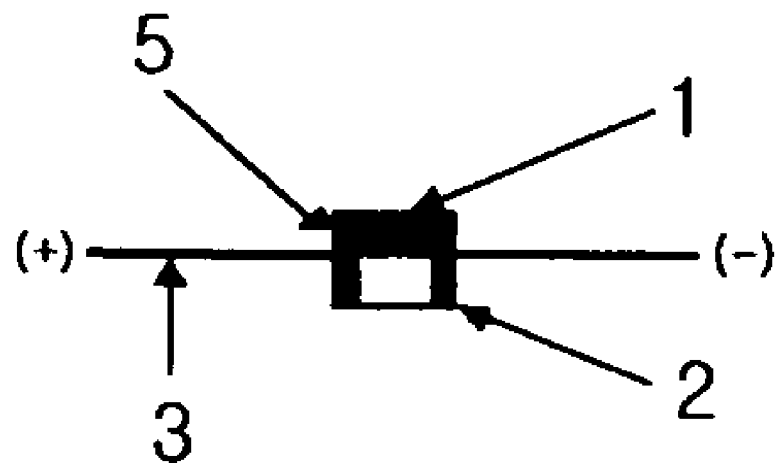
[Figure 2A]
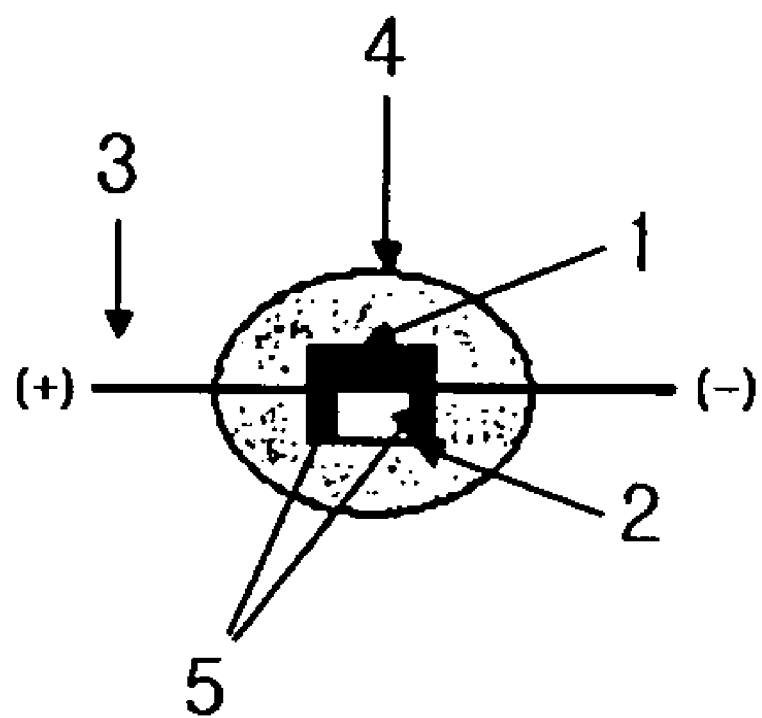
[Figure 2B]

【Figure 3A】
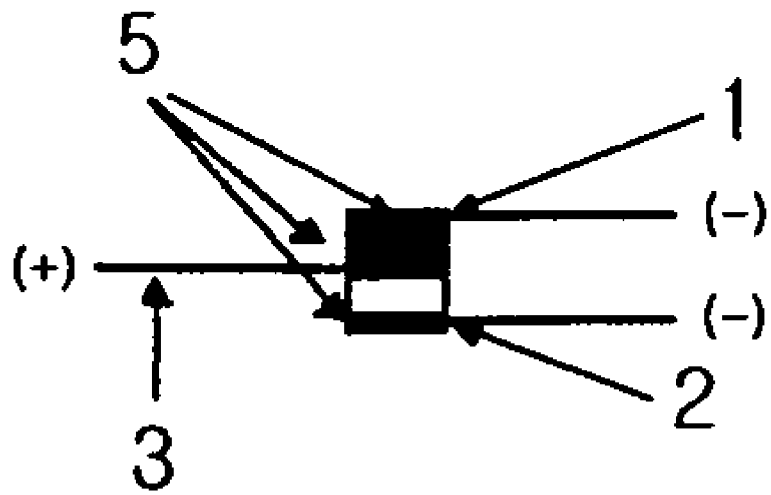
【Figure 3B】
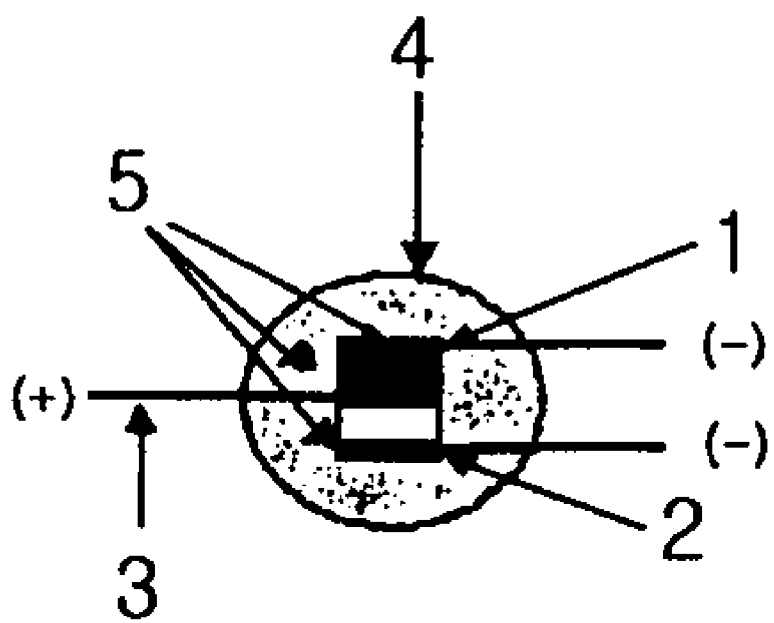

[Figure 4A]
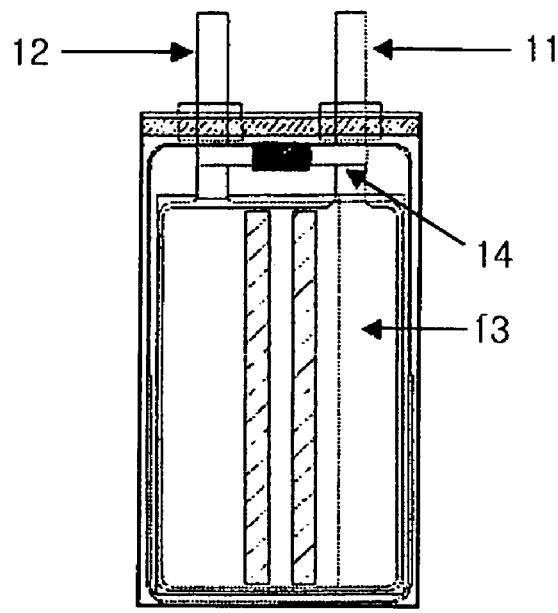
Connect contacted safety device
to interior of cell
[Figure 4B]
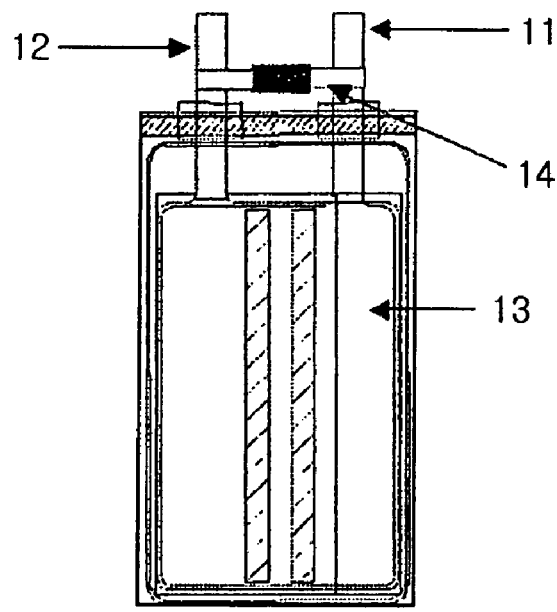
Connect contacted safety device
to interior of cell

[Figure 5]
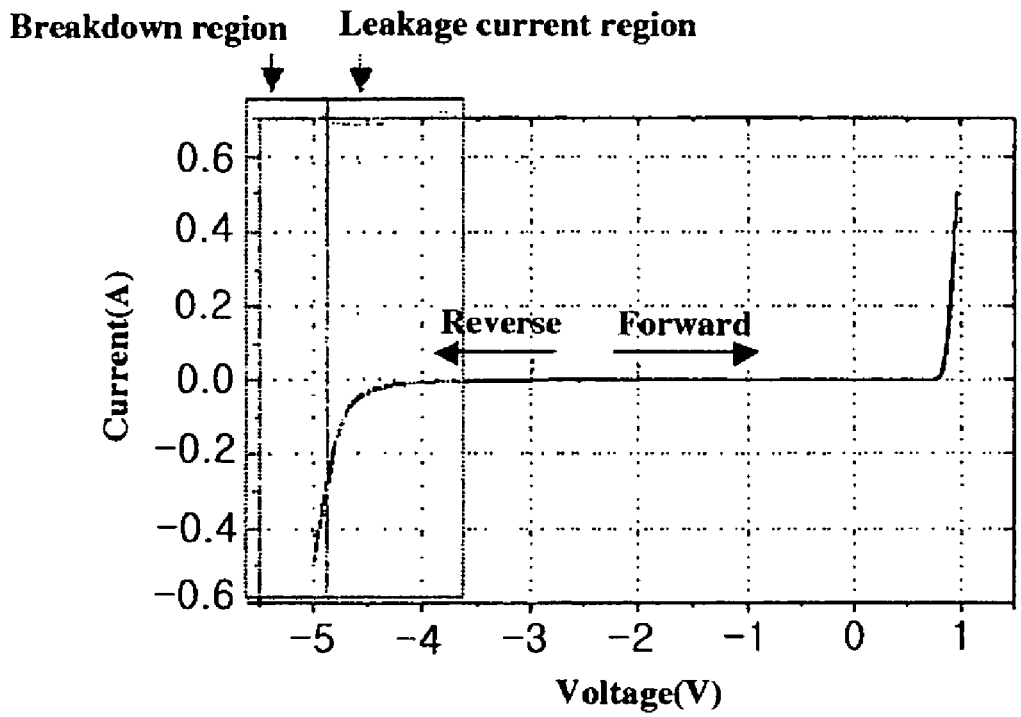
[Figure 6]
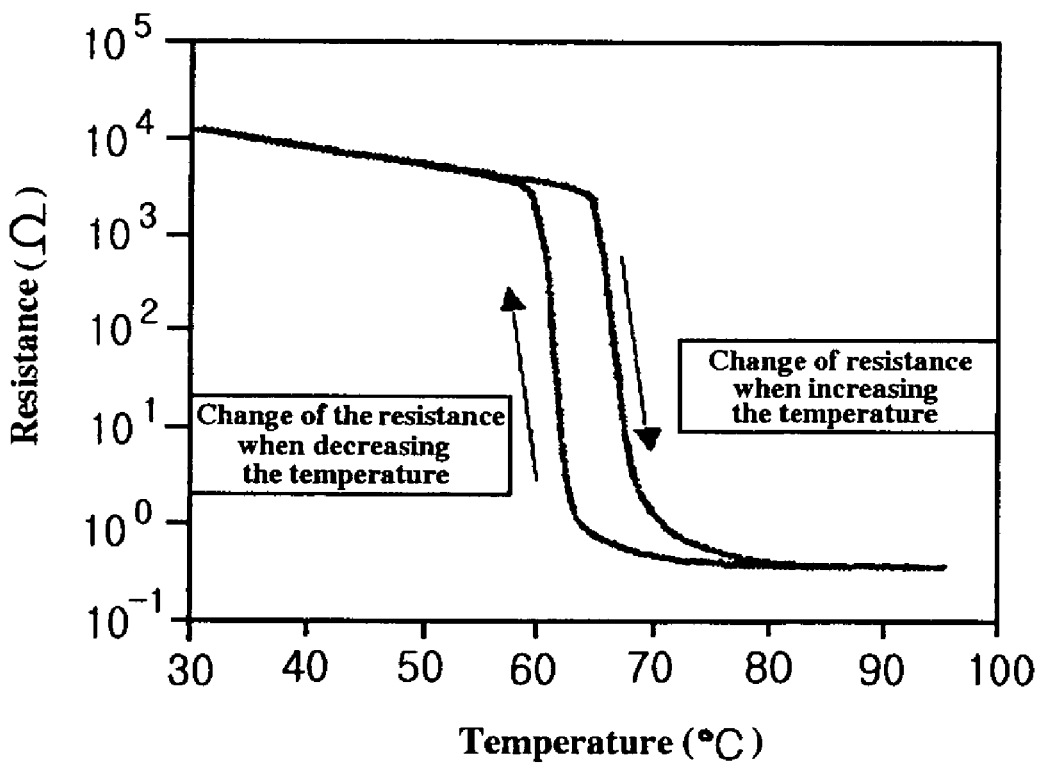

[Figure 7]
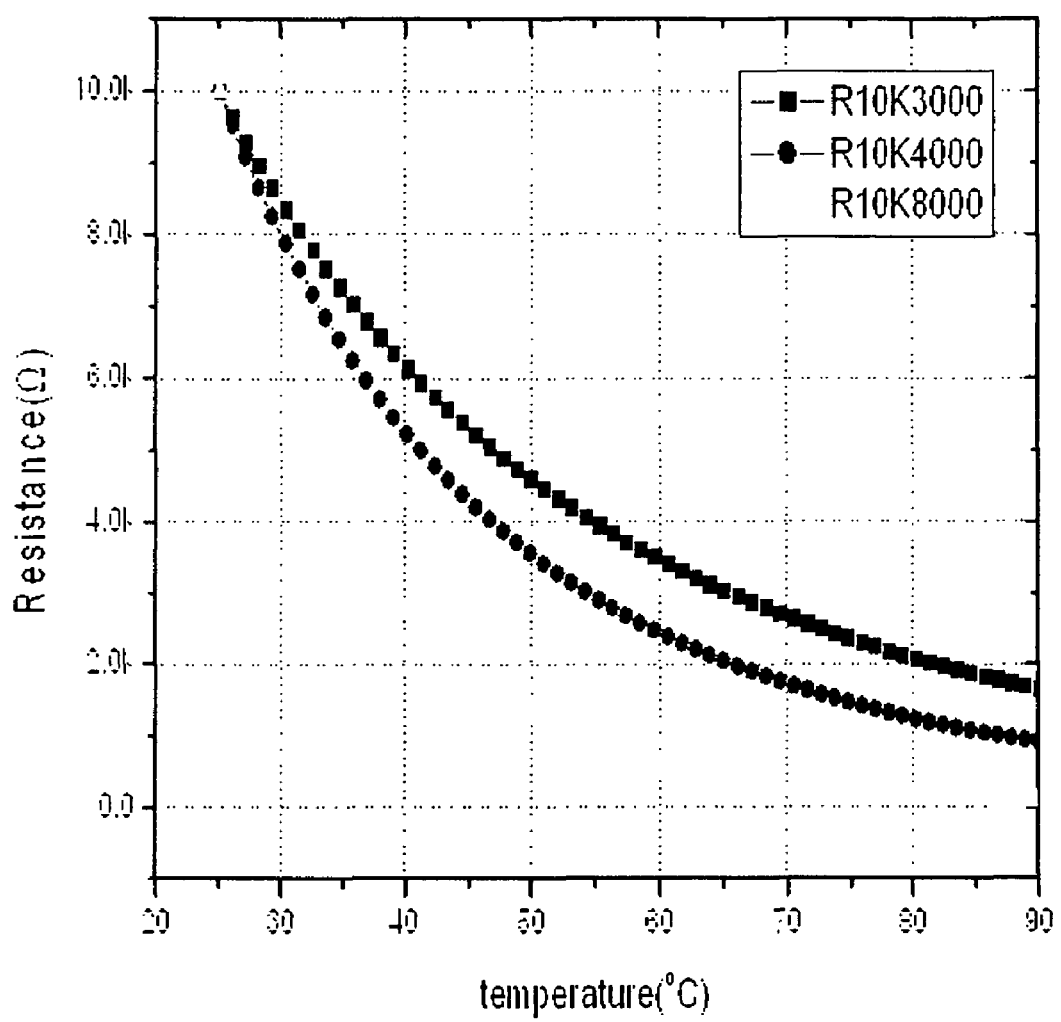

[Figure 8]
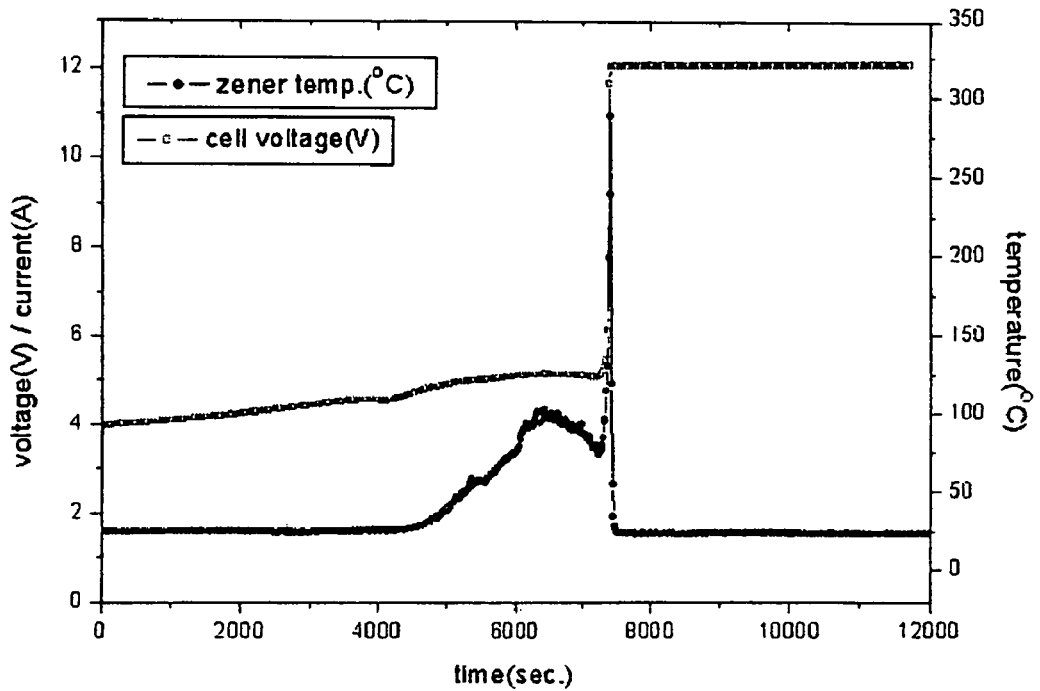
[Figure 9]
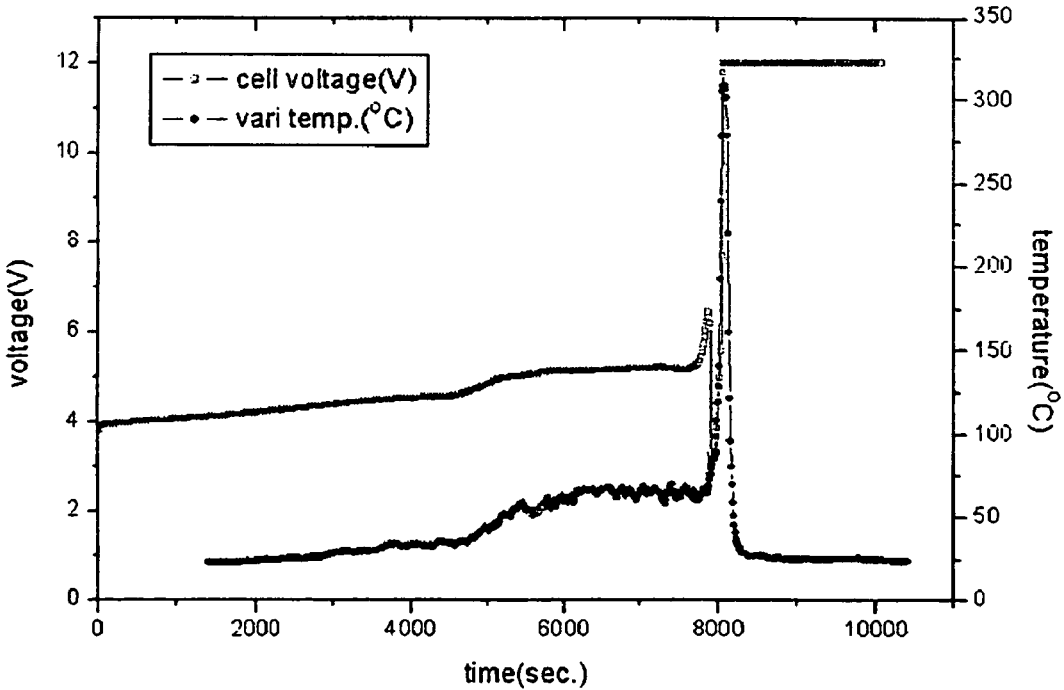

SAFETY DEVICE FOR PREVENTING OVERCHARGE OF SECONDARY BATTERIES AND SECONDARY BATTERIES THEREWITH

BACKGROUND OF THE INVENTION

1. Field of the Invention

The present invention relates to a safety device, which includes a simple safety element, for protecting a secondary battery from overvoltage and overheating caused by overcharge.

2. Description of the Related Art

Secondary batteries comprehend batteries such as a conventional Ni/Cd (nickel cadmium) battery, a Ni/MH (nickel metal hydride) ion lithium battery and a present lithium ion battery those are capable of charging and discharging. In recent years, the increasing interest in the lithium ion battery has made research and development much more prosperous. That is because the lithium ion battery has much higher energy density than the conventional Ni/Cd battery, Ni/MH battery and so forth. That is, since the lithium ion battery might be fabricated with small size and light weight, it is not only useful for the power source of the mobile device including a mobile phone, a camcorder and a notebook computer, but also considered as the power source of the electric vehicle.

Despite of the above advantages, the lithium ion battery has drawback that it is fragile from overcharge. That is, in case where the secondary battery is neglected without safety device against overcharge, there exists the risk of accidents, resulting in losing the life or the property due to burning out from explosion.

Considering the reaction among the participants forming the battery at the time of overcharge, there is increasing side reaction between $LiCoO_2$, which is active material in the cathode of the lithium ion battery, and electrolyte. Further, the side reaction results in the structural breakdown of the active material in the cathode and the oxidation of the electrolyte. Accordingly, the lithium may be deposited in the active material of the anode consisting of the graphite, etc. If the voltage continues to get higher after the battery reaches the above-said status, it will get exploded or burned out, which result in the accident.

Especially, the situation becomes worse when the voltage standard used in the secondary battery is a high voltage. For instance, in case of connecting the lithium ion secondary battery to the power supply for an automobile, 12V voltage is applied for a car, and 24V voltage for a truck by connecting two 12V power supplies together in series. As such, in case where overcharge is applied instantaneously more than the voltage specified in the standard of the secondary battery, the safety device is desired for protecting the secondary battery against the instant overvoltage.

In the prior art, a charge/discharge control circuit with high price, complex structure, and large occupied area was generally used for protecting the secondary battery against overcharge. In general, the charge/discharge control circuit is constituted such that an input voltage and the battery voltage, or an output voltage to an exterior and the battery voltage are compared to switch the charge/discharge circuit selectively. However, because a control parameter of the charge/discharge control is a voltage, the secondary battery is hardly protected from overheating (temperature). The scheme may be thought to protect the secondary battery from overheating by adding a temperature reacting element such as a PTC or a thermal cutoff. Adding the PTC or the thermal cutoff to the charge/discharge control circuit may contribute to preventing overcharge of the battery and temperature increase of the battery by breaking the applied current on overcharge. However, because the PTC or the thermal cutoff acts above a specified temperature, the temperature of the battery is required to increase above the specified temperature at which the PTC or the thermal cutoff acts. Further, in case where the battery is already on charge, it is difficult to acquire the stability of the battery only with the PTC or the thermal cutoff, which only breaks the applied current when the battery temperature increases due to the external shock, external environment change and internal shortage, etc.

SUMMARY OF THE INVENTION

An object of the present invention is to protect a secondary battery safely from overvoltage and overheating caused by overcharge by using a simple safety element. The present invention proposes the simple structure of the new contacted safety device. The contacted safety device is characterized by contacting two elements physically, which facilitates the discharge in terms of 2 factors of voltage and heat when overcharge occurs.

The contacted safety device according to the present invention is characterized by contacting together a constant voltage element having the discharge/heat dissipation characteristic at above a specified voltage and a metal insulator transition (MIT) element having a discharge characteristic at above a specified temperature. Therefore, because when the overcharge occurs the heat generated in the constant voltage element has an effect on the MIT element so that the MIT element experiences the discharge, the stability of the secondary battery is acquired even if the constant voltage element with low capacity is used.

The contacted safety device according to the present invention is characterized in that the applied portion of overvoltage beyond the standard of the secondary battery is discharged primarily subject to the discharge characteristic of the constant voltage element and the secondary discharge is made since the heat generated in the constant voltage element during the primary discharge causes the MIT element formed near the constant voltage element to act on. At this time, the MIT element experiences the discharge by reacting to the increase of the temperature due to other causes as well as due to the heat dissipation of the constant voltage element. Therefore, the discharge in terms of 2 factors of the voltage and the temperature can be performed, and thereby the discharge effect is improved reciprocally because the discharge/heat dissipation characteristic of the constant voltage element and the discharge characteristic are combined together. The battery in the state of discharge is safer in the problem being involved due to the external environment change, the external shock, and the internal short since the battery in the state of discharge has lower energy than the battery in the state of charge, and the former has more stable state in its active material and electrolyte.

BRIEF DESCRIPTION OF THE DRAWINGS

FIG. 1A shows the structure of combining a contacted safety device and a battery according to one embodiment of the present invention.

FIG. 1B shows the structure of coating a perimeter of the contacted safety device depicted in FIG. 1A with an anti-corrosive and moisture-proof outer material.

FIG. 1C shows the structure of contacting together the elements depicted in FIG. 1A after applying surroundings of each of them with an anti-corrosive and moisture-proof outer material.

FIG. 2A shows the structure of combining together a contacted safety device and a battery according to another embodiment of the present invention.

FIG. 2B shows the structure of coating a perimeter of the contacted safety device depicted in FIG. 2A with an anti-corrosive and moisture-proof outer material.

FIG. 3A shows the structure of combining together a contacted safety device and a battery according to another embodiment of the present invention.

FIG. 3B shows the structure of coating a perimeter of the contacted safety device depicted in FIG. 3A with an anti-corrosive and moisture-proof outer material.

FIG. 4A shows the structure that the contacted safety device is coupled to the interior of the battery cell according to one embodiment of the present invention.

FIG. 4B shows the structure that the contacted safety device is coupled to the exterior of the battery cell according to one embodiment of the present invention.

FIG. 5 is a graph representing current-voltage characteristics of a Zener diode that is one type of the constant voltage devices.

FIG. 6 is a graph representing change of resistance when increasing or decreasing the temperature of the material having MIT characteristic.

FIG. 7 is a graph showing change of resistance when increasing or decreasing the temperature of a negative temperature coefficient (NTC) thermistor device.

FIG. 8 is a graph representing change of the temperature due to the voltage increase in case of applying a constant current in 1 A to the Zener diode that is one of the constant voltage devices.

FIG. 9 is a graph representing change of the temperature due to the voltage increase in case of applying a constant current in 1 A to the varistor that is one type of the constant voltage devices.

DETAILED DESCRIPTION OF THE PREFERRED EMBODIMENTS

The present invention enables a secondary battery to be protected safely from overvoltage and overheating in case of overcharge by using a contacted safety device with simple and new structure. That is, in the contacted safety device according to the present invention, the heat generated in the constant voltage element in case of overcharge causes operation of the MIT element immediately by combining with physical adjacency the constant voltage element reacting to overvoltage and the MIT element reacting to overheating.

Explaining more specifically respective element of a contacted safety device according to the present invention, the constant voltage element is the same as a Zener diode or a varistor, which has a characteristic of making a current flowing impetuously when an external voltage is more than a predetermined value, such as overcharge, etc. That is, the stability of the battery is obtained by discharging a current in case of overcharge to lower the voltage of the battery. Especially, in the constant voltage element with a small capacity, the interval is pretty short between the voltage with a leakage current and the voltage with an impetuous current flow. Therefore, in case of overcharge, the primary discharge occurs at the time when the leakage current starts to flow in the constant voltage element, and subsequently, the heat generated in the constant voltage element makes an effect on the MIT element when reaching the voltage with impetuous current flow, resulting in discharge in the MIT element.

Therefore, even if the constant voltage element with small capacity is used for the contacted safety device, the stability can be improved.

Meanwhile, the MIT element consists of oxide material of a vanadium group such as VO, $VO_2$, $V_2O_3$, etc. and $Ti_2O_3$ or material with the elements St, Ba, La, etc. added to such material, which has MIT (metal insulator transition) characteristic that its resistance decreases abruptly at above the specified temperature. Therefore, the battery can be safely protected, since the current flows out due to the decrease of the resistance when the temperature increases, resulting in a lower voltage.

A critical temperature of the MIT element is preferably equal to and above 50° C. and below 150° C. In case where the resistance begins to decrease at below 50° C., the remaining capacity will decrease since the battery gets discharged between −20° C. through 60° C., at which the battery is typically used. In case where the resistance begins to decrease at above 150° C., the battery will be burned out or exploded by the external shock or environment.

Hereinafter, the embodiment is described in detail with reference to the drawings.

FIG. 1A shows the structure of combining together a contacted safety device and a battery according to one embodiment of the present invention. The connection of elements contained in a contacted safety device and the connection to each of terminals of the secondary battery are as follows: first, a constant voltage element 1 and a MIT element 2 are contacted at one side surface in a horizontal direction (a contact surface); the constant voltage element 1 is connected in parallel between a cathode lead 12 and an anode lead 11 of the battery; and the MIT element 2 is also connected in parallel between the cathode lead 12 and the anode lead 11 of the battery.

FIG. 1B shows the structure of coating a perimeter of the contacted safety device depicted in FIG. 1A with an anti-corrosive and moisture-proof outer material. Also in this case, the constant voltage element and the MIT element are physically connected via the anti-corrosive and moisture-proof outer material. The scheme of connecting between each electrode terminal and each contact element in FIG. 1B is the same as that in FIG. 1A.

And, FIG. 1C shows the structure of applying surroundings of the constant voltage element and the MIT element with an anti-corrosive and moisture-proof outer material, respectively to contact the 2 elements together at one side surface in a horizontal direction (a contact surface). Also in this case, the constant voltage element and the MIT element are physically connected via the anti-corrosive and moisture-proof outer material. The scheme of connecting between each electrode terminal and each contact element in FIG. 1C is the same as that in FIG. 1A.

According to the contacted safety device depicted in FIGS. 1A through 1C, a primary discharge occurs via a metal line connected to the constant voltage element subject to discharge characteristic of the constant voltage element when an external voltage increases above the specified voltage, and a secondary discharge occurs via a metal line connected to the MIT element when the heat, which occurs at the constant voltage element due to the primary discharge, increases the temperature of the MIT element which is contacted physically with the constant voltage element, subject to heat dissipation characteristic of the constant voltage element. Therefore, the MIT element experiences the discharge independently subject to the temperature increase resulting from other factors as well as the MIT element reacts to voltage increase resulting from the discharge with conjunction of the heat dissipation characteristic of the constant voltage element.

And, each element of the contacted safety device may be applied with an anti-corrosive and moisture-proof outer material after being contacted together, as depicted in FIG. 1A, and each element may be contacted together after being applied with an anti-corrosive and moisture-proof outer material, as depicted in FIG. 1C.

FIG. 2A shows the structure of combining a contacted safety device and a battery according to another embodiment of the present invention. Referring to FIG. 2A, the constant voltage element 1 and the MIT element 2 are contacted in one side surface in a horizontal direction (a contact surface), an electric contact 5 is formed at both ends in a longitudinal direction of the constant voltage element and the MIT element, and each element of the contacted safety device 14 is connected in parallel with one common metal line between a cathode lead and an anode lead of the secondary battery via the electric contact 5. Even in this case, both of the constant voltage element and the MIT element are connected in parallel between a cathode and an anode.

And, FIG. 2B shows the structure of coating a perimeter of the contacted safety device depicted in FIG. 2A with an anti-corrosive and moisture-proof outer material. Also in this case, the constant voltage element and the MIT element are physically connected via the anti-corrosive and moisture-proof outer material.

The contacted safety device depicted in FIGS. 2A and 2B is characterized in that electric contact of a metal and conducting material is formed at both ends in a longitudinal direction of the contacted safety device in which the constant voltage element and the MIT element are contacted together, and via the electric contact a cathode lead and an anode lead are capable of being connected with one common metal line.

And, in the contacted safety device depicted in FIGS. 2A and 2B, the electric contact is formed on both ends of the contacted safety device. Thereby, if the cathode/anode leads and each element of the contacted safety device are connected via one common metal line, the discharge occurs via the common metal line, not via a respective metal line in the constant voltage element and the MIT element. In this case, it is advantageous to reduce the number of solders required for the process of connecting the metal lines and each of elements.

FIG. 3A shows the structure of combining a contacted safety device and a battery according to another embodiment of the present invention. Referring to FIG. 3A, the constant voltage element 1 and the MIT element 2 is contacted in one side surface (a contact surface) in a horizontal direction via an electric contact 5. The other electric contact 5 is formed on the other side (an opposing surface) in a horizontal direction of each of the elements. One common metal line 3, via which a cathode lead of the secondary battery is connected, is connected to the electric contact 5 of the contact surface between the constant voltage element and the MIT element. An anode lead 11 of the secondary battery is connected via a respective metal line 3 to the electric contacts 5 formed respectively on the other side surface (the opposing surface) of the MIT element 2. Therefore, the constant voltage element 1 and the MIT element 2 are connected in parallel between the cathode lead 12 and the anode lead 11 of the battery.

And, FIG. 3B shows the structure of coating a perimeter of the contacted safety device depicted in FIG. 3A with an anti-corrosive and moisture-proof outer material. Even in this case, the constant voltage element and the MIT element are physically connected via the anti-corrosive and moisture-proof outer material.

The contacted safety device depicted in FIGS. 3A and 3B has the electric contact 5 formed on the other side surface (the opposing surface) of each of elements in a horizontal direction instead of having the electric contact 5 formed on both ends of the contacted safety device as depicted in FIGS. 2A and 2B. In this case, the cathode lead 12 of the secondary battery and the electric contact, which corresponds to the contact surface of each of the elements, are connected via a common metal line, and the anode lead 11 is connected to the electric contacts 5 formed respectively on the other side (the opposing surface) of the constant voltage element and the MIT element via a metal line 3. Therefore, the constant voltage element and the MIT element are connected in parallel between the cathode lead and the anode lead.

The contacted safety device as depicted in FIGS. 3A and 3B is connected to cathode/anode lead of the secondary battery via electric contact formed on the contact surface and the opposing surface on each of the element. In this case, considering that the electric contact of the contacted safety device are fabricated in the deposition scheme, etc., the above is easier to fabricate the cathode/anode lead than forming the electric contacts in a longitudinal direction as depicted in FIGS. 2A and 2B.

FIG. 4A shows the structure that the contacted safety device is coupled to the interior of the battery cell according to one embodiment of the present invention.

FIG. 4B shows the structure that the contacted safety device is coupled to the exterior of the battery cell according to one embodiment of the present invention.

The contacted safety device as depicted in FIGS. 1A through 3B may be connected between a cathode lead 12 and an anode lead 11 of the secondary battery and may be connected inside or outside the cell.

FIG. 5 is a graph representing current-voltage characteristics of a Zener diode that is one of the constant voltage devices.

The constant voltage element refers to the element in which the voltage drops by the exceeded voltage by the leakage current in case where more than the specified voltage is applied. Referring to FIG. 5, if more than 3.5V voltage is applied, the element reaches the leakage current region, and if continuously increasing the voltage, the element reaches the breakdown region in which the element is destroyed completely. And, the smaller the capacity is, the smaller the leakage current is and the smaller is the difference between the voltage at which the leakage current occurs and the voltage at which the current is conducted abruptly. And, the phenomenon of heat dissipation follows the conduction. The phenomenon of the heat dissipation is described in detail.

FIG. 6 is a graph representing change of resistance when increasing or decreasing the temperature of the material having MIT characteristics; and FIG. 7 is a graph showing change of a resistance when increasing or decreasing the temperature of a negative temperature coefficient (NTC) thermistor element.

Referring to FIG. 6, the resistance of the MIT element decreases abruptly when the temperature of the battery increases to 70° C., and the resistance increases abruptly when the temperature of the battery decreases to 62° C., which shows the hysteresis curve in total. The temperature for changing the resistance of the MIT element is preferably about 50° C. through 150° C.

Referring to FIG. 7, which is different from the abrupt resistance change in the MIT element depicted in FIG. 6, because the NTC element has a resistance change characteristic subject to temperature change in the semiconductor, the resistance change shows an exponential function graph in form. In case of a semiconductor, the higher the temperature is, the more severely the resistance reduces, since the number of electrons increases which is transitioned towards a conduction band and the mobility of electron in the conduction band increases. Therefore, the NTC, which is mainly used in the range of 130° C., has a resistance change curve as depicted in FIG. 7. Therefore, the NTC thermistor element is not desirable to use, since the battery gets the discharge due to leakage current occurring in the range of −20° C. through 60° C., where the battery will be generally used.

However, the MIT element has a form of resistance-temperature change that is different from that of the NTC element, which has a resistance-temperature change in a semiconductor since the MIT element has the metal insulator transition characteristic that the resistance varies rapidly from the insulator to the metal at the specified temperature, as seen in FIG. 6. Therefore, the MIT element can be used with stability free of drawback of battery discharge as well as it discharges the battery only when the battery is overcharged. In this regard, the present invention adopts the MIT element as a factor of the safety device for overcharge prevention.

FIG. 8 is a graph representing change of the temperature due to the voltage increase in case of applying a constant current in 1 A to the Zener diode that is one of the constant voltage devices.

Referring to FIG. 8, it can be proven that the temperature increases abruptly at the time that the conduction starts with the Zener diode.

FIG. 9 is a graph representing change of the temperature due to the voltage increase in case of applying a constant current in 1 A to the varistor that is one of the constant voltage devices.

Similarly, from FIG. 9, it can be proven that the temperature increases abruptly at the time when the conduction starts with the varistor.

The present invention connects in parallel, between the cathode lead and the anode lead of the secondary battery, the contacted safety device which has the constant voltage element having characteristic of discharge/heat dissipation at more than the specified voltage and the MIT element having characteristic of discharge at more than the specified temperature as coupled, thereby resulting in discharge in terms of 2 factors of voltage and temperature in case of overcharge.

In other words, when the current flows towards the constant voltage element in case of overcharge, the constant voltage element emits the heat. At this time, the coupled MIT element has the resistance lower responsive to the temperature increase of the constant voltage element, therefore resulting in higher discharge through the current flow. Therefore, in accordance with the present invention, connecting the MIT element to the constant voltage element, in which its temperature increases with current conduction when the voltage increases, results in solving the safety problem of not only ignition and explosion due to the temperature increase but of the voltage increase.

What is claimed is:

1. A contacted safety device having a constant voltage element and a metal insulator transition (MIT) element combined, said constant voltage element having discharge/heat dissipation characteristic at more than a predetermined voltage, said MIT element having charge emitting characteristic at more than a predetermined temperature, said MIT element having an insulator-to-metal transition characteristic so that resistance of said MIT element decreases by a factor of about 1000 over a 20° C. change in temperature staffing at the predetermined temperature, wherein a critical temperature of said MIT element is equal to and above 50° C. and below 80° C.

2. The contacted safety device as claimed in claim 1, wherein said constant voltage element is a Zener diode or a varistor.

3. The contacted safety device as claimed in claim 1, wherein said constant voltage element has a low capacity.

4. The contacted safety device as claimed in claim 1, further comprising an electrical contact formed on a contact surface in a horizontal direction between said constant voltage element and said MIT element of the contacted safety device.

5. The contacted safety device as claimed in claim 4, further comprising an electrical contact formed on both end surfaces in a longitudinal direction of the contacted safety device.

6. The contacted safety device as claimed in claim 4, further comprising an electrical contact formed on an opposing surface in the horizontal direction, which is faced against the contact surface in the horizontal direction of the contacted safety device.

7. The secondary battery wherein the constant voltage element and the MIT element are connected between a cathode lead and an anode lead of the battery via a respective metal line in the contacted safety device according to claim 1.

8. The secondary battery wherein a cathode lead and an anode lead is respectively connected to both of the end surfaces of the contacted safety device according to claim 5 via a common metal line.

9. The secondary battery wherein, in the contacted safety device of claim 6, a cathode terminal of the battery is connected to a battery contact formed on the contact surface between the constant voltage element and the MIT element a common metal line and an anode terminal of the battery is connected to the electrical contact formed respectively on an opposing surface which is faced against the contact surface between the constant voltage element and the MIT element via a respective metal line.

10. The secondary battery wherein the safety contact device according to claim 1 is connected between a cathode lead and an anode lead of the secondary battery inside the secondary cell.

11. The secondary battery wherein the safety contact device according to claim 1 is connected between a cathode lead and an anode lead of the secondary battery outside the secondary cell.

* * * * *